United States Patent Office 3,488,354
Patented Jan. 6, 1970

3,488,354
SUBSTITUTED 7,8 - DIHYDRO - 6-HYDROXY-6,14-ENDO (ETHENO OR ETHANO)CODIDE - 7-KETONES AND SUBSTITUTED 7,8 - DIHYDRO-6-HYDROXY-6,14-ENDO (ETHENO OR ETHANO) MORPHIDE-7-KETONES
John Johnston Brown, Pearl River, N.Y., and Robert Allis Hardy, Jr., Ridgewood, and Carol Therese Nora, Fort Lee, N.J., assignors to American Cyanamid Company, Stamford, Conn., a corporation of Maine
No Drawing. Continuation-in-part of application Ser. No. 643,341, June 5, 1967. This application Sept. 27, 1967, Ser. No. 671,129
Int. Cl. C07d 43/28; A61k 27/00
U.S. Cl. 260—285          8 Claims

ABSTRACT OF THE DISCLOSURE

This disclosure describes compounds of the class of substituted 7,8-dihydro-6-hydroxy-6,14-endo(etheno or ethano)codide-7-ketones and substituted 7,8-dihydro-6-hydroxy-6,14-endo(etheno or ethano)morphide-7-ketones which possess analgesic activity.

CROSS REFERENCE TO RELATED APPLICATION

This application is a continuation-in-part of our copending application Ser. No. 643,341, filed June 5, 1967, now abandoned.

BRIEF SUMMARY OF THE INVENTION

This invention relates to novel substituted 7,8-dihydro-6-hydroxy-6,14-endo(etheno or ethano)codide-7-ketones and substituted 7,8-dihydro-6-hydroxy-6,14-endo(etheno or ethano)morphide-7-ketones and to methods of preparing these compounds. The novel compounds of the present invention may be represented by the following general formula:

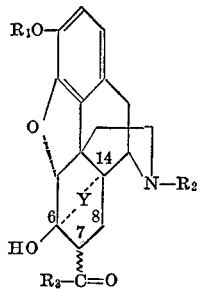

wherein $R_1$ is hydrogen, lower alkyl or lower alkanoyl; $R_2$ is hydrogen, cyano, propargyl, lower alkyl, phenyl lower alkyl, lower alkenyl or lower cycloalkylmethyl; $R_3$ is hydrogen, phenyl or alkyl of from 1 to 8 carbon atoms; and Y is etheno or ethano. Suitable lower alkyl or lower alkanoyl groups contemplated by the present invention are those having from 1 to 4 carbon atoms such as methyl, ethyl, isopropyl, n-butyl, formyl, acetyl, propionyl, isobutyryl, etc. Typical alkyl groups of from 1 to 8 carbon atoms are, for example, methyl, ethyl, n-propyl, n-butyl, isoamyl, sec.-hexyl, n-heptyl, iso-octyl, etc. Suitable lower alkenyl groups are those having up to about 6 carbon atoms such as, for example, allyl, methallyl, dimethallyl, and the like. Suitable lower cycloalkylmethyl groups are those having from 4 to 7 carbon atoms such as cyclopropylmethyl, cyclobutylmethyl, cyclopentylmethyl, etc. Phenyl lower alkyl is exemplified by benzyl, α-phenylethyl, β-phenylethyl, and the like.

DETAILED DESCRIPTION OF THE INVENTION

The novel compounds of the present invention are generally obtainable as crystalline materials having characteristic melting points and absorption spectra. They are appreciably soluble in many organic solvents such as ethanol, chloroform, benzene, ethyl acetate, and the like. They are, however, generally insoluble in water.

The organic bases of this invention form non-toxic acid-addition salts with a variety of organic and inorganic salt-forming agents. Thus, acid-addition salts, formed by admixture of the organic free base with the equivalent amount of an acid, suitably in a neutral solvent, are formed with such acids as sulfuric, phosphoric, hydrochloric, hydrobromic, citric, lactic, tartaric, acetic, gluconic, ascorbic, and the like. Also included within the purview of the present invention are the alkali metal salts (e.g., sodium and potassium) of the organic free bases when $R_1$ in the above general formula is hydrogen. For purposes of this invention, the organic free bases are equivalent to their non-toxic acid-addition salts and their alkali metal salts.

The novel substituted 7,8-dihydro-6-hydroxy-6,14-endo (etheno or ethano)codide-7-ketones and substituted 7,8-dihydro-6-hydroxy-6,14-endo(etheno or ethano) morphide-7-ketones (I) of the present invention may be readily prepared from a substituted 6-amino-7,8-dihydro-6,14-endoethenocodide-7-ketone or a substituted 6-amino-7,8-dihydro-6,14-endoethenomorphide-7-ketone (II) as shown by the following reaction scheme:

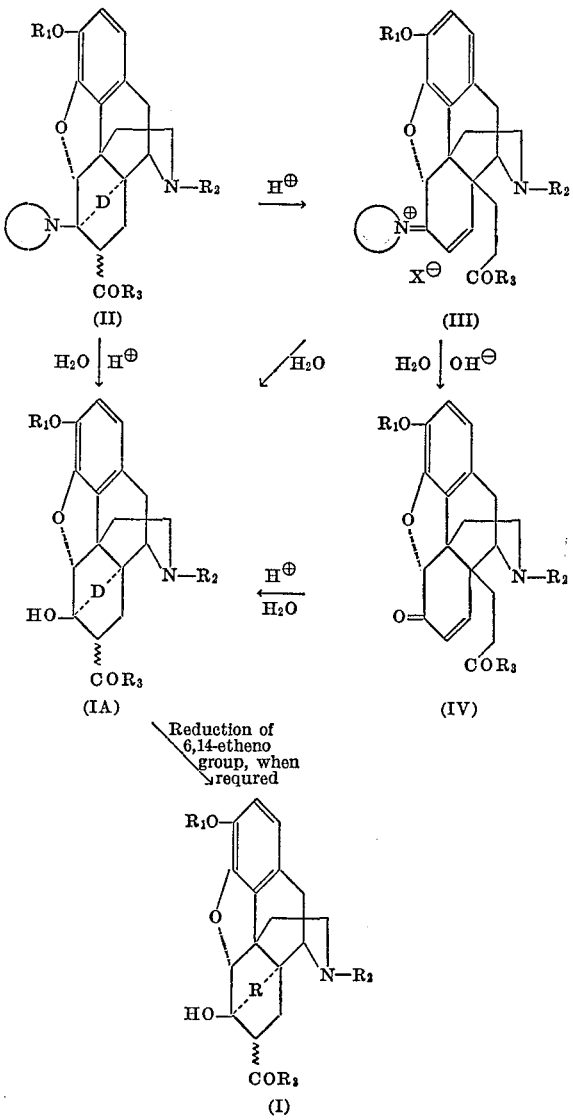

wherein $R_1$, $R_2$, $R_3$ and Y are as defined above, X is the anion of an acid, and

is pyrrolidinyl, piperindino, morpholino or di(lower alkyl)amino. By this scheme a 6-amino-7-ketone derivative (II) may be treated with aqueous acid and a novel 7,8-dihydro-6-hydroxy-6,14-endoetheno(codide or morphide)-7-ketone (I–A) of this invention isolated directly. Alternately, these 6-hydroxy-7-ketone derivatives (I–A) may be prepared from isolated intermediates which are derived from the 6-amino-7-ketone derivatives (II). These procedures include cyclizations of the 14-(2-acylethyl)eniminium salts (III) and cyclizations of the 14-(2-acylethyl)codeinones and morphinones (IV). Synthesis of the novel compounds of the present invention via eniminium salts (III) and/or 14-(2-acylethyl) derivatives (IV) which may be prepared in situ and cyclized without isolation, or which may be isolated and purified before conversion to the novel 6-hydroxy-7-ketone (I–A) is, therefore, included within the purview of this invention.

The direct conversion of 6-amino-7-ketones (II) to the novel 6-hydroxy-7-ketones (I–A) of this invention is generally carried out by treatment with dilute aqueous acids. Suitable acids are hydrochloric, perchloric, sulfuric, and the like. The temperature range is from about 20° C. to about 100° C., with heating to 50° C.–100° C. a preferred range. This insures substantially complete conversion in a reasonable time, usually from a few minutes to several hours or more.

Conversion of the 14-(2-acylethyl)eniminium salts (III) to the novel 6-hydroxy-7-ketones (I–A) of this invention is readily effected by heating with water. The temperature range is from about 50° C. to about 100° C., and the reaction is substantially complete in several hours or more.

Synthesis of the novel 6-hydroxy-7-ketones (I–A) of this invention from isolated 14-(2-acylethyl)codeinones and morphinones (IV) is also readily accomplished by treatment with dilute aqueous acids. Suitable acids are hydrochloric, perchloric, sulfuric, and the like. The temperature range is from about 20° C. to about 100° C., with the preferred range 50° C.–100° C. for from a few minutes to several hours or more.

The intermediate 14-(2-acylethyl)eniminium salts (III) may be prepared and isolated for further conversion to the novel compounds of this invention by treatment of the 6-amino-7-ketone derivatives (II) with mineral acids in alcoholic solution under relatively mild conditions. Suitable acids are perchloric, hydrochloric, sulfuric, and the like. Suitable solvents are methanol, ethanol, and the like. The temperature range is from about 10° C. to about 30° C., with the preferred temperature of about 25° C., for from several minutes to several hours or more.

The 14-(2-acylethyl)codeinones and morphinones (IV), which may also be isolated and then cyclized to the novel compounds of this invention, are obtained and isolated by treatment of the 14-(2-acylethyl)eniminium salts (III) with dilute aqueous alkali under mild conditions. Suitable bases include sodium hydroxide, potassium hydroxide, barium hydroxide and the like. The temperature range is from about 10° C. to about 30° C., and the preferred temperature is about 25° C. The conversion is substantially complete after a few minutes at room temperature, and the 14-(2-acylethyl) derivatives (IV) are readily isolated by prompt extraction into a nonaqueous solvents such as methylene chloride, drying and evaporation of solvent.

The 6,14-endoethano derivatives (I, Y=ethano) of this invention are readily prepared by catalytic reduction of the appropriate 6,14-endoetheno derivative (I–A) using methods well known to those skilled in the art.

The 6-amino-7-ketone derivatives (II), required as intermediates in the above-described reaction scheme, are readily prepared as described in detail in our U.S. Patent No. 3,318,885.

The novel products of the present invention are useful and valuable as analgesic agents which may show a variety of types of analgesic activity within the general scope of analgesic or anti-nociperceptive actions. These include morphine-like modes of action; non-narcotic analgesic modes of action; and analgesic antagonist modes of action. The overall analgesic activity of a given compound within the scope of the present invention may be readily determined by applying one or more of the routine tests described hereinbelow. The specific type of analgesic activity of a given compound may then be judged by those skilled in the art from the combined results of these several test procedures.

The novel compounds of the present invention are active analgesics when measured by the "writhing syndrome" test for analgesic activity as described by Siegmund et al., Proc. Soc. Exptl. Biol. Med., Vol. 95, p. 729 (1957), with modifications. This method is based upon the reduction of the number of writhes following the intraperitoneal injection of one mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to grups of two mice each 30 minutes before injection of the phenyl-p-quinone. The total number of writhes exhibited by each group of mice is recorded for a 3-minute period commencing 15 minutes after injection of the phenyl-p-quinone. A compound is considered active if it reduces the total number of writhes in two test mice from a control value of approximately 30 per pair to a value of 18 or less. In a representative operation, and merely by way of illustration, 7α - acetyl-7,8-dihydro-6-hydroxy-6,14-endoethenocodide, showed analgesic activity when tested by this procedure at an oral dose of 25 mg./kg. of body weight. If desired, the median effective dose ($ED_{50}$) for any particular compound may be calculated from the results obtained by repeating this test in multiple groups of two mice at each of several graded dose levels.

A supplementary procedure which generally indicates a morphine-like mode of action is the rat tail-flick method described by F. E. D'Amour and D. L. Smith, J. Pharmacol. Exptl. Therap., vol. 72, p. 74 (1941), with modifications The compounds (generally as hydrochloride salts in 0.9% saline) are administered subcutaneously to groups of 5 rats each. Graded doses are given to several groups of rats. These rats are then individually subjected to the heat stimulus from a spot light lamp and a condensing lens focused on the blackened tip of the rat tail. The characteristic response to this presumably painful heat stimulus is to flick the tail out of the concentrated beam of the heat source. The response time (in seconds) is measured for control and treated groups, and the criterion of analgesia is an approximate 100% increase in response time over controls. Established clinically active analgesics such as meperidine, codeine, morphine, etc., are active in the above test. When tested by this procedure, certain compounds of the present invention show this type of analgesic action. For example, 7α-acetyl-7,8-dihydro-6-hydroxy-6,14-endoethenocodide shows morphine-type actions, when so tested, approximately equal to the potency of morphine sulfate.

Additionally, supplementary routine tests known to those skilled in the art may be carried out to assess the importance of side effects frequently associated with the morphine-like analgesics. These include such actions as onset and duration of action, development of tolerance, respiratory depression, addiction liability, relative effects by oral and parenteral administration, and inhibitory effects on the gastrointestinal system.

Other compounds of this invention may show analgesic antagonist activity when tested against a selected dose of morphine or other morphine-like agents. This antagonist activity may be considered useful as a specific antidote for an overdose of a morphine-like agent, or for its non-narcotic analgesic action. Experience has shown that such narcotic antagonists are also capable of relieving pain despite the fact that they are generally inactive in the rat tail-flick procedure (see above), and have little or no addiction hazard; see L. S. Harris and A. K. Pierson, J. Pharmacol. Exptl. Therap., vol 143, p. 141 (1964). Analgesics which produce satisfactory pain-relief without serious side effects, particularly with regard to the tolerance, habituation and drug dependence of the opiates, have been sought for many years.

In addition, supplementary test procedures such as measuring the elevation of the pain threshold of rat paws inflamed with brewer's yeast may be carried out to confirm the analgesic action of the novel compounds of the present invention. In certain cases, these compounds also show anti-inflammatory activity.

When mixed with suitable excipients or diluents, the compounds of this invention can be prepared as pills, capsules, tablets, powders, solutions, suspensions and the like for unit dosage and to simplify administration. As analgesics they will relieve pain by direct action on the nerve centers or by diminishing the conductivity of the sensory nerve fibers. The novel compounds of the present invention may also be administered in combination therapy with salicylates such as aspirin and the like.

The compounds of the present invention are also valuable intermediates for the preparation of a variety of other compounds, which possess analgesic activity, by means of additional transformations. For example, when 7α-acetyl-7,8-dihydro-6-hydroxy - 6,14 - endoethenocodide is reacted with methyllithium, 7,8-dihydro - 7 - (1 - hydroxy-1 - methylethyl) - 6 - hydroxy - 6,14 - endoethenocodide is obtained and is a morphine-type analgesic agent.

The novel compounds of this invention may exist in several isomeric forms such as stereoisomers. It is to be understood that the present invention includes within its scope all such isomeric forms. For example, the codides and morphides used as starting materials have several asymmetric carbon atoms, and epimers at the C–7 asymmetric center are possible and are known. During the course of the above described conversions from starting materials to the new products of this invention the asymmetry of the C–7 center is eliminated and then reformed. Formation of stereoisomers, or epimers, at C–7 is therefore possible in the products of this invention and is apparent by examination of certain of the crude products formed by the above cyclization. The nuclear magnetic resonance (n.m.r.) spectra of these 7α- and 7β-ketone derivatives of the 7,8 - dihydro - 6 - hydroxy - 6,14-endo (etheno or ethano)codides and morphides are particularly helpful in characterizing the mixtures of epimers or the substantially pure stereoisomers as obtained from the reaction mixtures or from subsequent purification and separations. These isomers may then be separated by methods (such as fractional crystallization and partition-chromatography) well known to those skilled in the art. All such stereoisomeric forms of the 7-ketone derivatives of the 7,8 - dihydro - 6 - hydroxy - 6,14 - endo-(ethano or ethano) codides and morphides are, therefore, included within the purview of this invention.

In accordance with accepted convention, an α-substituent at the 7-position is behind the plane of the paper whereas a β-substituent at the 7-position is in front of the plane of the paper. This is usually represented by a - - - - bond for an α-substituent, a—bond for a β-substituent, and a ∼ bond where both are indicated.

The invention will be described in greater detail in conjunction with the following specific examples.

EXAMPLE 1

Preparation of 7α-acetyl-7,8-dihydro-6-hydroxy-6,14-endoethenocodide

A solution of 7α-acetyl - 7,8 - dihydro - 6 - (1 - pyrrolidinyl) - 6,14 - endoethenocodide (1.0 g.) in dilute hydrochloric acid (1.2 ml. 12 N HCl+78.8 ml. H$_2$O) is heated on a steam bath for 3 hr. The solution is then made basic with aqueous sodium bicarbonate solution, and the mixture is extracted with methylene chloride. The methylene chloride extracts are washed with water, dried, and evaporated to give an oil which crystallizes upon addition of ether. Collection with ether gives crude product (709 mg.). A solution of the crude product in methylene chloride is treated with charcoal and solvent is evaporated. Recrystallization of the residue from ether gives 7α-acetyl-7,8 - dihydro - 6 - hydroxy - 6,14 - endoethenocodide (387 mg.), M.P. 170° C.–173° C. A further amount (77 mg.), M.P. 169° C.–172° C. is obtained from the mother liquor to give a combined yield of 53%.

Examination of the crude product by thin layer chromatography and by n.m.r. indicates the presence of a mixture of 7α- and 7β-epimers (ca. 90% 7α- and 10% 7β-by n.m.r.). Purification by treatment with charcoal followed by recrystallization, as described above, then gives substantially pure 7α-epimer, or, if desired, the mixture of epimers may be separated by partition chromatography.

EXAMPLE 2

Preparation of 7α-acetyl-7,8-dihydro-6-hydroxy-6,14-endoethenocodide 14-(2 - acetylethyl)codide - $\Delta^{6,1'}$ - pyrrolidinium diperchlorate (100 mg.) and water (5 ml.) are heated under reflux for 2 hr. Aqueous sodium bicarbonate is added and the mixture is extracted with methylene chloride. The dried extract is evaporated and the crystalline residue is recrystallized from ether to give 7α - acetyl-7,8 - dihydro - 6 - hydroxy - 6,14 - endoethenocodide (30 mg., ca. 50%), M.P. 157° C.–161° C.

EXAMPLE 3

Preparation of 7α-acetyl-7,8-dihydro-6-hydroxy-6,14-endoethenocodide

A solution of 14 - (2 - acetylethyl)codeinone (50 mg.) in dilute hydrochloric acid (1 ml.; 6 N) is heated at 45° C. for 30 min. The solution is neutralized with aqueous sodium bicarbonate and the product is extracted with methylene chloride which is then washed with water and dried. Evaporation of solvent followed by crystallization of the residue from acetone-n-hexane gives 7α-acetyl-7,8-dihydro - 6 - hydroxy - 6,14-endoethenocodide (40 mg.; 80%), M.P. 165° C.–167° C.

EXAMPLE 4

Preparation of 14-(2-acetylethyl)codide-$\Delta^{6,1'}$-pyrrolidinium diperchlorate Perchloric acid (1.5 ml.; 72%) is added dropwise to a stirred suspension of 7α - acetyl - 7,8 - dihydro - 6 - (1-pyrrolidinyl) - 6,14 - endoethenocodide (1.0 g.) in methanol (20 ml.). Solution takes place and after a few minutes the product starts to separate. After 1½ hr. this material is collected, washed with methanol, and dried to give the yellow 14 - (2 - acetylethyl)codide - $\Delta^{6,1'}$ - pyrrolidinium diperchlorate (1.3 g.; 88%), M.P. 275 C.–276° C. with decomposition.

EXAMPLE 5

Preparation of 14-(2-acetylethyl)codeinone

A suspension of 14 - (2 - acetylethyl)codide - $\Delta^{6,1'}$-pyrrolidinium diperchlorate (500 mg.) in methylene chloride (50 ml.) is shaken with aqueous sodium hydroxide (50 ml.; 5%) for a few minutes until the mixture becomes almost colorless. The layers are separated and the methylene chloride is washed three times with water and dried. The residue obtained by evaporation of solvent is crystallized from acetone-n-hexane to give 14-(2-acetylethyl)codeinone (225 mg.; 76%), M.P. 149° C.–151° C.

EXAMPLE 6
Preparation of 7-formyl-7,8-dihydro-6-hydroxy-6,14-endoethenocodide A solution of 7α - formyl - 7,8 - dihydro - 6 - (1-pyrrolidinyl) - 6,14 - endoethenocodide (300 mg.) in dilute hydrochloric acid (0.36 ml. 12 N HCl+24.0 ml. H$_2$O) is heated on a steam bath for ca. 4 hr. The solution is then made basic with aqueous sodium bicarbonate solution, and the mixture is extracted with ether. The ether extract is washed with water, dried, and evaporated to give 7 - formyl - 7,8 - dihydro - 6 - hydroxy-6,14-endoethenocodide (ca. 200 mg.).

EXAMPLE 7
Preparation of 7-benzoyl-7,8-dihydro-6-hydroxy-6,14-endoethenocodide Following the procedure of Example 1, 7-benzoyl-7,8-dihydro - 6(1 - pyrrolidinyl) - 6,14 - endoethenocodide is treated with dilute hydrochloric acid. Neutralization with base followed by isolation of the product then gives 7-benzoyl-7,8-dihydro-6-hydroxy - 6,14-endothenocodide.

EXAMPLE 8
Preparation of 7α-acetyl-7,8-dihydro-6-hydroxy-6,14-endoethenomorphide Following the procedure of Example 1, 7α-acetyl-7,8-dihydro - 6 - (1 - pyrrolidinyl) - 6,14 - endoethenomorphide is treated with dilute hydrochloric acid. Neutralization with base followed by isolation of the product gives 7α - acetyl - 7,8 - dihydro - 6 - hydroxy - 6,14 endoethenomorphide.

EXAMPLE 9
Preparation of 7α-acetyl-N-allyl-7,8-dihydro-6-hydroxy-6,14-endoethenonorcodide Following the procedure of Example 1, 7α-acetyl-N-allyl - 7,8 - dihydro - 6 - (1 - pyrrolidinyl) - 6,14 - endoethenonorcodide is treated with dilute hydrochloric acid. Neutralization with base followed by isolation of the product gives 7α - acetyl - N - allyl - 7,8 - dihydro - 6 - hydroxy-6,14-endoethenonorcodide.

EXAMPLE 10
Preparation of 7α-acetyl-N-cyclopropylmethyl-7,8-dihydro-6-hydroxy-6,14-endoethenonorcodide Following the procedure of Example 1, 7α-acetyl-N-cyclopropylmethyl - 7,8 - dihydro - 6 - (1 - pyrrolidinyl)-6,14-endoethenonorcodide is treated with dilute hydrochloric acid. Neutralization with base followed by isolation of the product gives 7α-acetyl-N-cyclopropylmethyl-7,8-dihydro-6-hydroxy-6,14-endoethenonorcodide.

EXAMPLE 11
Preparation of 7α-acetyl-7,8-dihydro-6-hydroxy-6,14-endoethenocodide Following the procedure of Example 1, 7α-acetyl-7,8-dihydro - 6 - morpholino - 6,14 - endoethenocodide, prepared from 6-demethoxy-6-morpholinothebaine and methyl vinyl ketone, is treated with dilute hydrochloric acid. Neutralization with base followed by isolation of the product gives 7α - acetyl - 7,8 - dihydro - 6 - hydroxy-6,14-endoethenocodide.

EXAMPLE 12
Preparation of 7α-acetyl-7,8-dihydro-6-hydroxy-6,14-endoethanocodide 7α - acetyl - 7,8 - dihydro - 6 - hydroxy - 6,14 - endoethenocodide in ethanol is hydrogenated with palladium on charcoal as a catalyst. Isolation of the product gives 7α-acetyl-7,8-dihydro-6-hydroxy-6,14-endoethanocodide.

EXAMPLE 13
Preparation of 7α-acetyl-7,8-dihydro-6-hydroxy-6,14-endoethenonorcodide Following the procedure of Example 1, 7α-acetyl-7,8-dihydro - 6 - (1 - pyrrolidinyl) - 6,14 - endoethenonorcodide is treated with dilute hydrochloric acid. Neutralization with base followed by isolation of the product gives 7α - acetyl - 7,8 - dihydro - 6 - hydroxy - 6,14 - endoethenonorcodide.

EXAMPLE 14
Preparation of 7α-acetyl-7,8-dihydro-6-hydroxy-N-(3-methyl-2-buten-1-yl)-6,14-endoethenonorcodide 7α - acetyl - 7,8 - dihydro - 6 - hydroxy - 6,14 - endoethenonorcodide is treated with 3-methyl-2-buten-1-yl bromide in an inert solvent. Isolation of the product gives 7α - acetyl - 7,8 - dihydro - 6 - hydroxy - N - (3 - methyl-2-buten-1-yl)-6,14-endoethenonorcodide.

EXAMPLE 15
Preparation of 7α-acetyl-7,8-dihydro-6-hydroxy-N-propargyl-6,14-endoethenonorcodide 7α - acetyl - 7,8 - dihydro-6-hydroxy-6,14-endoethenonorcodide is treated with propargyl bromide in an inert solvent. Isolation of the product gives 7α-acetyl-7,8-dihydro-6-hydroxy-N-propargyl-6,14-endoethenonorcodide.

EXAMPLE 16
Preparation of 7α-acetyl-7,8-dihydro-6-hydroxy-N-propyl-6,14-endoethenonorcodide 7α - acetyl - 7,8 - dihydro-6-hydroxy-6,14-endoethenonorcodide is treated with propyl bromide in an inert solvent. Isolation of the product gives 7α-acetyl-7,8-dihydro-6-hydroxy-N-propyl-6,14-endoethenonorcodide.

EXAMPLE 17
Preparation of 7α-acetyl-7,8-dihydro-6-hydroxy-N-phenethyl-6,14-endoethenonorcodide 7α - acetyl - 7,8 - dihydro-6-hydroxy-6,14-endoethenonorcodide is treated with phenethyl bromide in an inert solvent. Isolation of the product gives 7α-acetyl-7,8-dihydro-6-hydroxy-N-phenethyl-6,14-endothenonorcodide.

EXAMPLE 18
Preparation of 7α-acetyl-N-cyclopropylmethyl-7,8-dihydro-6-hydroxy-6,14-endothenonormorphide Following the procedure of Example 1, 7α-acetyl-N-cyclopropylmethyl - 7,8 - dihydro-6-(1-pyrrolidinyl)-6,14-endoethenonormorphide is treated with dilute hydrochloric acid. Neutralization with base followed by isolation of the product gives 7α-acetyl-N-cyclopropylmethyl-7,8-dihydro-6-hydroxy-6,14-endoethenonormorphide.

EXAMPLE 19
Preparation of 7-butyryl-7,8-dihydro-6-hydroxy-6,14-endoethenocodide Following the procedure of Example 1, 7-butyryl-7,8-dihydro - 6 - (1-pyrrolidinyl)-6,14-endoethenocodide is treated with dilute hydrochloric acid. Neutralization with base followed by isolation of the product gives 7-butyryl-7,8-dihydro-6-hydroxy-6,14-endoethenocodide.

EXAMPLE 20
Preparation of 3,7α-diacetyl-7,8-dihydro-6-hydroxy-6,14-endoethenomorphide 7α - acetyl - 7,8 - dihydro-6-hydroxy-6,14-endoethenomorphide is treated with acetic anhydride. Isolation of the product gives 3,7α - diacetyl-7,8-dihydro-6-hydroxy-6,14-endoethenomorphide.

EXAMPLE 21

Preparation of 7,8-dihydro-7-(1-hydroxy-1-methylethyl)-6-hydroxy-6,14-endoethenocodide Lithium metal (40 mg.) is added in small pieces to a stirred solution of 7α-acetyl-7,8-dihydro-6-hydroxy-6,14-endoethenocodide (40 mg., 0.11 mmole) in ether (4 ml.) and methyl iodide (1 ml.). The reaction mixture is stirred at room temperature for 30 min., and is then decomposed by the addition of water. The ether layer is separated, the water is extracted twice with ether, and the combined ether fractions are washed with water and dried. The oil obtained by evaporation of the solvent is crystallized from acetone-n-hexane to give 7,8-dihydro-7-(1-hydroxy-1-methylethyl)-6-hydroxy-6,14-endoethenocodide (17 mg.; 41%), M.P. 244–249° C.

We claim:
1. A compound of the formula:

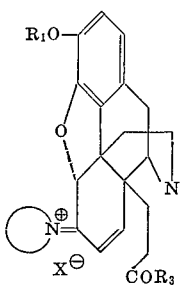

wherein $R_1$ is selected from the group consisting of hydrogen, lower alkyl and lower alkanoyl– $R_2$ is selected from the group consisting of hydrogen, cyano, propargyl, lower alkyl, phenyl lower alkyl, lower alkenyl and lower cycloalkylmethyl; $R_3$ is selected from the group consisting of hydrogen, phenyl and alkyl of from 1 to 8 carbon atoms;

is selected from the group consisting of pyrrolidinyl, piperidino, morpholino and di(lower alkyl)amino; and $X^\ominus$ is the anion of amineral acid.

2. A compound according to claim 1 wherein $R_1$, $R_2$ and $R_3$ are methyl,

is pyrrolidinyl, and $X^\ominus$ is perchlorate.

3. A compound of the formula:

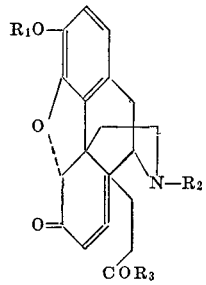

wherein $R_1$ is selected from the group consisting of hydrogen, lower alkyl and lower alkanoyl; $R_2$ is selected from the group consisting of hydrogen, cyano, propargyl, lower alkyl, phenyl lower alkyl, lower alkenyl and lower cycloalkylmethyl; and $R_3$ is selected from the group consisting of hydrogen, phenyl and alkyl of from 1 to 8 carbon atoms.

4. A compound according to claim 3 wherein $R_1$, $R_2$ and $R_3$ are methyl.

5. 7α - acetyl-7,8-dihydro-6-hydroxy-6,14-endoethenocodide.

6. 7α - acetyl-7,8-dihydro-6-hydroxy-6,14-endoethenomorphide.

7. 7α - acetyl - N - cyclopropylmethyl-7,8-dihydro-6-hydroxy-6,14-endoethenonorcodide.

8. 7α - butylryl - 7,8 - dihydro-6-hydroxy-6,14-endoethenocodide.

References Cited

UNITED STATES PATENTS

| | | | |
|---|---|---|---|
| 3,332,950 | 7/1967 | Blumberg | 260—285 |
| 2,766,245 | 10/1956 | Gates | 260—285 |
| 3,318,886 | 5/1967 | Brown et al. | 260—285 |
| 3,329,862 | 7/1967 | Bentley | 260—285 |

FOREIGN PATENTS

| | | |
|---|---|---|
| 902,659 | 8/1962 | Great Britain. |

OTHER REFERENCES

Bentley, Chemistry of the Morphine Alkaloids, Oxford, 1954, p. 290 relied on.

Bentley et al., Proc. Chem. Soc. (London), 1963, p. 220.

DONALD G. DAUS, Primary Examiner

U.S. Cl. X.R.

260—247.2; 424—260

PO-1050
(5/69)

UNITED STATES PATENT OFFICE
CERTIFICATE OF CORRECTION

Patent No. 3,488,354          Dated January 6, 1970

Inventor(s) John Johnston Brown, Robert Allis Hardy and Carol Therese Nora

It is certified that error appears in the above-identified patent and that said Letters Patent are hereby corrected as shown below:

Column 2, lines 27-40, that portion of formula (II)

reading 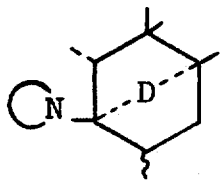   should read 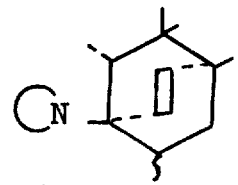

lines 43-55, that portion of formula (IA)

reading 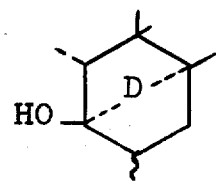   should read 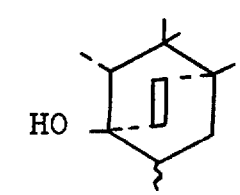

lines 56-59, "Reduction of 6,14-etheno group, when requred"   should read -- Reduction of 6,14-etheno group, whe required lines 60-72, that portion of formula (I)

reading 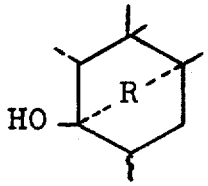   should read 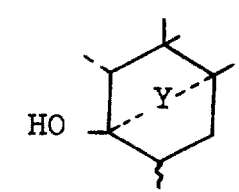

Column 3, line 6, "piperindino" should read -- piperidino --; line 21, "-ketone" should read -- -ketones --. Column 4, line 2 "grups" should read -- groups --. Column 9, lines 20-30, that portion of the formula reading 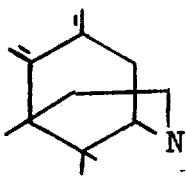   should read 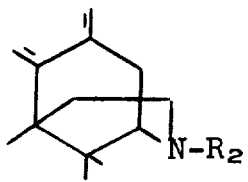

line 33, "alkanoyl-" should read -- alkanoyl; --. Column 10, line 28, "butylryl" should read -- butyryl --.

(SEAL)
Attest:

SIGNED AND SEALED
JUN 16 1970

Edward M. Fletcher, Jr.
Attesting Officer

WILLIAM E. SCHUYLER, JR
Commissioner of Patents